(12) United States Patent
Tu et al.

(10) Patent No.: US 9,256,634 B2
(45) Date of Patent: Feb. 9, 2016

(54) RESUMING BIG DATA TRANSFORMATIONS

(71) Applicants: Enping Tu, Cupertino, CA (US); Wu Cao, Redwood City, CA (US); YunKei Tsang, Cupertino, CA (US); Hui Xu, Cupertino, CA (US); Anil Samudrala, Newark, CA (US)

(72) Inventors: Enping Tu, Cupertino, CA (US); Wu Cao, Redwood City, CA (US); YunKei Tsang, Cupertino, CA (US); Hui Xu, Cupertino, CA (US); Anil Samudrala, Newark, CA (US)

(73) Assignee: Business Objects Software, Ltd., Dublin (IE)

( * ) Notice: Subject to any disclaimer, the term of this patent is extended or adjusted under 35 U.S.C. 154(b) by 227 days.

(21) Appl. No.: 13/971,988

(22) Filed: Aug. 21, 2013

(65) Prior Publication Data

US 2015/0058292 A1    Feb. 26, 2015

(51) Int. Cl.
*G06F 7/02*    (2006.01)
*G06F 17/30*    (2006.01)

(52) U.S. Cl.
CPC .... *G06F 17/30339* (2013.01); *G06F 17/30477* (2013.01)

(58) Field of Classification Search
CPC .......... G06F 11/1625; G06F 17/30575; G06F 11/1658; G06F 11/1662; G06F 11/1412; G06F 17/30339; G06F 17/30477
See application file for complete search history.

(56) References Cited

U.S. PATENT DOCUMENTS

| | | | |
|---|---|---|---|
| 5,912,902 A | 6/1999 | Monroe | |
| 6,092,087 A | 7/2000 | Mastors | |
| 6,175,933 B1 | 1/2001 | Cadden | |
| 6,526,447 B1 | 2/2003 | Giammaria | |
| 7,634,595 B1 | 12/2009 | Brown et al. | |
| 7,672,979 B1 * | 3/2010 | Appellof | G06F 11/1435 707/649 |
| 7,739,547 B2 * | 6/2010 | Chen | G06F 11/1471 714/15 |
| 7,757,239 B2 | 7/2010 | Beck | |
| 8,239,782 B2 | 8/2012 | Sinzig et al. | |
| 8,250,215 B2 | 8/2012 | Stienhans et al. | |
| 8,473,584 B2 | 6/2013 | Sabiwalsky | |
| 8,924,355 B1 * | 12/2014 | Kundzich | G06F 17/30 707/647 |
| 2010/0145933 A1 | 6/2010 | Consul et al. | |
| 2012/0150791 A1 * | 6/2012 | Willson | 707/600 |
| 2012/0151250 A1 | 6/2012 | Saika | |
| 2012/0173641 A1 | 7/2012 | Dahlseide | |
| 2013/0066838 A1 | 3/2013 | Singla et al. | |
| 2014/0331109 A1 * | 11/2014 | Wakuda et al. | 714/799 |

FOREIGN PATENT DOCUMENTS

| | | |
|---|---|---|
| EP | 1638001 A1 | 3/2006 |
| EP | 1777675 A1 | 4/2007 |

* cited by examiner

*Primary Examiner* — Bruce Moser
(74) *Attorney, Agent, or Firm* — Schwegman Lundberg & Woessner, P.A.

(57) ABSTRACT

Systems and methods for resuming data transformations, such as broken or otherwise unsuccessful data transformations, are described. In some example embodiments, the systems and methods receive a message that indicates a broken data transformation of a data table between a source database and a destination database, identify a maximum and/or largest and greatest value for a date attribute contained within an index column for all rows of the data table that were successfully loaded to the destination database during the data transformation, and select a group of rows of data of the data table stored in the source database by querying the source database to identify rows that include a value for the date attribute that is greater than the identified value.

20 Claims, 10 Drawing Sheets

| BATCH | CREATED_AT | DATA |
|---|---|---|
| BATCH_SALES | 11:01 | SALES DATA |
| BATCH_USERS | 11:02 | USER DATA |
| BATCH_PROD | 11:04 | PRODUCT DATA |
| BATCH_SALES2 | 12:27 | SALES DATA |

FIG. 5B

| BATCH | CREATED_AT | DATA |
|---|---|---|
| BATCH_SALES | 11:01 | SALES DATA |
| BATCH_USERS | 11:02 | USER DATA |
| BATCH_PROD | 11:04 | PRODUCT DATA |
| BATCH_SALES2 | 12:25 | SALES DATA |
| BATCH_SALES3 | 12:27 | SALES DATA |

FIG. 5C

| BATCH | CREATED_AT | DATA |
|---|---|---|
| BATCH_SALES | 11:01 | SALES DATA |
| BATCH_USERS | 11:02 | USER DATA |
| BATCH_PROD | 11:04 | PRODUCT DATA |
| BATCH_SALES2 | 12:25 | SALES DATA |
| BATCH_SALES3 | 12:27 | SALES DATA |

FIG. 5D

RESUMING BIG DATA TRANSFORMATIONS

TECHNICAL FIELD

The subject matter disclosed herein generally relates to the processing of data and, for example, to reading, copying, or otherwise transforming data.

BACKGROUND

Typically, a transformation of a large set of data (e.g., a table having millions or billions of rows) from one database to another database is time-consuming, and uses a large time window within which to complete all tasks, such as data reading tasks, data loading tasks, and so on. Because the time window is large, issues (e.g., network problems, component failures, and so on) often arise during the transformation. These issues may cause the transformation to fail or otherwise be unsuccessful, which may lead to the restarting of the transformation and may prevent any transformations of very large amounts of data, because issues arising during a large or big data transformation may be highly probable.

BRIEF DESCRIPTION OF THE DRAWINGS

The present technology is illustrated by way of example, and not by way of limitation, in the figures of the accompanying drawings.

FIGS. 5A-5D are schematic diagrams illustrating an example of resuming a data transformation, in some example embodiments.

DETAILED DESCRIPTION

Overview

Systems and methods for resuming data transformations, such as broken or otherwise unsuccessful data transformations, are described. In some example embodiments, the systems and methods receive a message that indicates a broken data transformation of a data table between a source database and a destination database, identify a maximum value for a date attribute contained within an index column for all rows of the data table that were successfully loaded to the destination database during the data transformation, and select a group of rows of data of the data table stored in the source database by querying the source database to identify rows that include a value for the date attribute that is greater than the identified maximum value.

For example, the systems and methods may identify a maximum value for a created_at attribute, and query the source database to identify rows of data that include value that is larger than the maximum value of the created_at attribute for the rows of data stored in the destination database, among other things.

In resuming the broken transformation, the systems and methods, in some example embodiments, may sort the selected group of rows of data of the data table stored in the source database and cause various operations to be performed by one or multiple loaders associated with the destination database, among other things.

Therefore, the systems and methods provide various ways to resume data transformations, enabling data transformations between databases (e.g., between a source and destination database) for big or large amounts of data (e.g., millions of rows of a structured query language, or SQL, table) by providing mechanisms to resume broken or otherwise unsuccessful transformations, among other things.

In the following description, for purposes of explanation, numerous specific details are set forth to provide a thorough understanding of example embodiments. It will be evident to one skilled in the art, however, that the present subject matter may be practiced without these specific details.

Example Computing Environment

Figure 1:
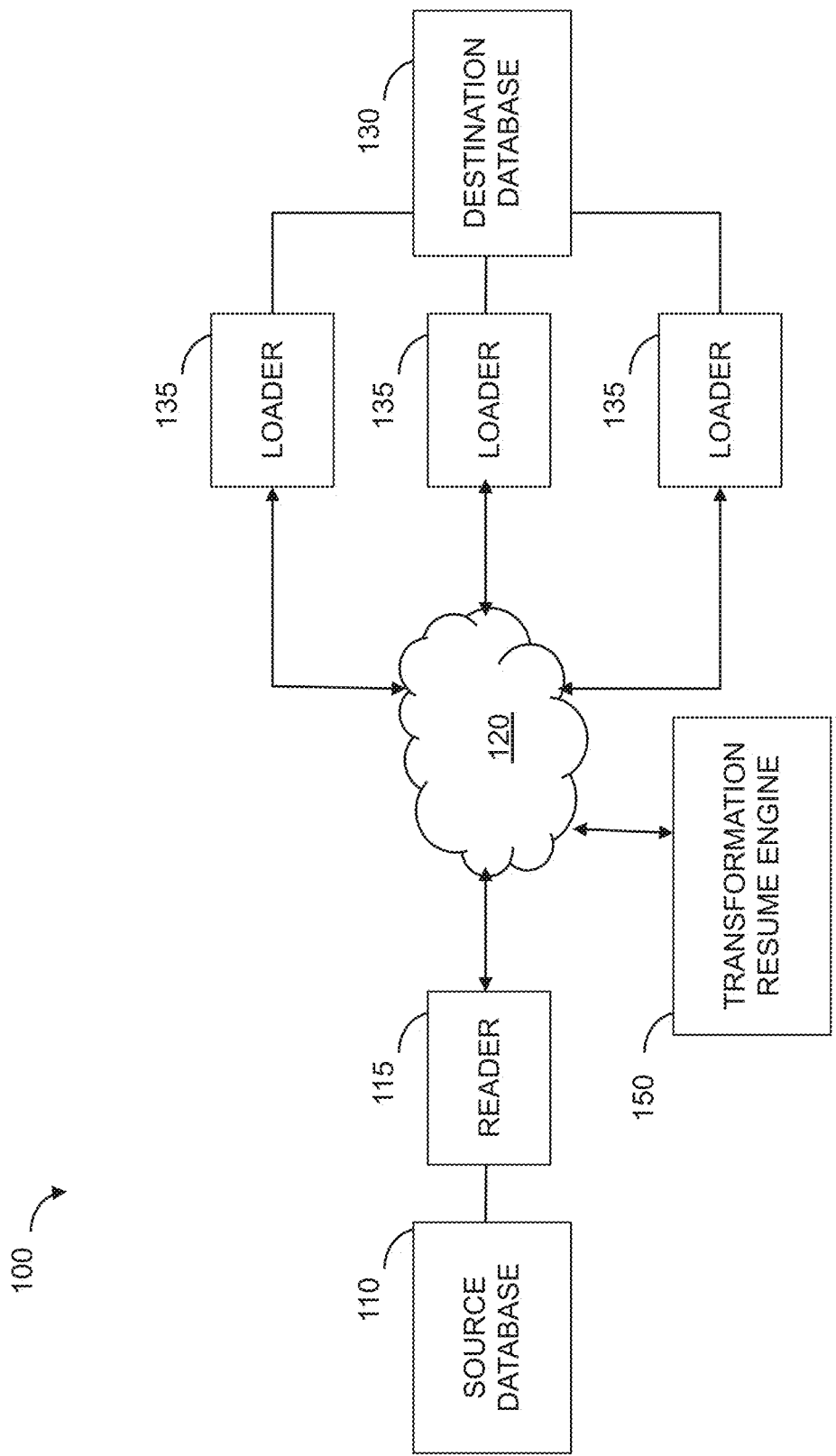
FIG. 1 is a network diagram illustrating a network environment for data transformation operations, in some example embodiments.

FIG. 1 is a network diagram illustrating a network environment 100 for data transformation operations, in some example embodiments. The network environment 100 may include one or more databases that store data, such as a source database 110 and a destination database 130. As used herein, a "database" is a data storage resource and may store data structured as a table (e.g., an SQL table), a text file, a spreadsheet, a relational database (e.g., an object-relational database), a triple store, a hierarchical data store, at a cloud web service API, or any suitable combination thereof.

A transformation operation, transfer operation, and/or copy operation of data from the source database 110 to the destination database 130 may involve various tasks and associated machines, devices, or components. For example, a reader 115 associated with the source database 110 reads the data (e.g., data from a large table of data) to be transformed, a network 120 facilitates the transfer of read data to one or more loaders 135 associated with the destination database 130, and the loaders 135 perform various operations to load, write, or copy the data to the destination database 130. For example, a single loader 135 may perform all load operations, or multiple loaders 135 may each load batches of data during the load operations.

The network 120 may be any network that enables communication between or among machines, databases, and devices. Accordingly, the network 120 may be a wired network, a wireless network (e.g., a mobile or cellular network), a storage area network (SAN), or any suitable combination thereof. The network 120 may include one or more portions of a private network, a public network (e.g., the Internet), or any suitable combination thereof.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed herein with respect to FIG. 6. Moreover, any two or more of the machines, databases, or devices illustrated in FIG. 1 may be combined into a single machine, and the functions described herein for any single machine, database, or device may be subdivided among multiple machines, databases, or devices.

As described herein, a typical data transformation on a big or large set of data (e.g., millions of rows of data from a data table) from the source database 110 to the destination database 130 often breaks or is otherwise unsuccessful due to various issues that arise during the time (e.g., 5 hours or more) of the transformation, such as issues associated with the instability of the network 120, issues associated with the performance of various components (e.g., the reader 115 and/or the loader 135), the instability of the source database 110 and/or the destination database 130, and so on.

The network environment 100, therefore, includes a transformation resume engine 150 that performs various methods and/or processes to identify states of data transformations when they break or fail, in order to determine and/or select any remaining data not yet transformed between databases. Thus, in some example embodiments, the transformation resume engine 150 includes various modules and/or components configured to resume big or large data transformations, among other things.

Examples of Resuming Data Transformations

Figure 2:
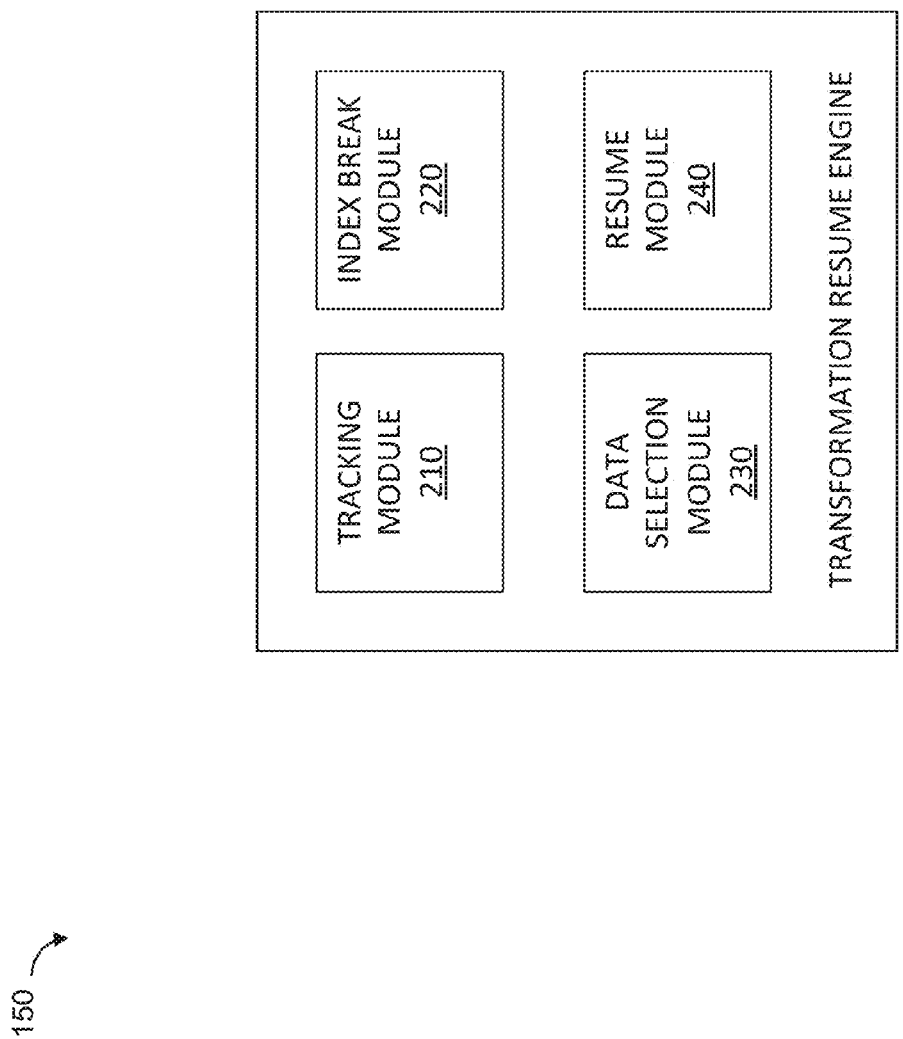
FIG. 2 is a block diagram illustrating the components of a transformation resume engine, in some example embodiments.

As described herein, the transformation resume engine 150 enables the resuming of data transformations or other data storage operations, such as broken operations, among other things. FIG. 2 is a block diagram illustrating the components of a transformation resume engine 150, in some example embodiments.

In some example embodiments, the transformation resume engine 150 may include one or more modules and/or components to perform one or more operations of the transformation resume engine 150. The modules may be hardware, software, or a combination of hardware and software, and may be executed by one or more processors. For example, the transformation resume engine 150 may include a tracking module 210, an index break module 220, a data selection module 230, and a resume module 240.

In some example embodiments, the tracking module 210 is configured and/or programmed to track operations of a data transformation and determine an occurrence of a broken data transformation of a data table between the source database 110 and the destination database 130. For example, the tracking module 210 may receive a message that indicates an occurrence of a broken data transformation of a data table between the source database 110 and the destination database 130. A broken data transformation may be any transformation that does not complete or is otherwise unsuccessful. The received message, therefore, may indicate an error, failure, or other occurrence during the transformation that indicates the transformation was unsuccessful in transforming a requested set of data from the source database 110 to the destination database 130, such as a loader 135 failure, a batch tracking queue being too long or too slow (e.g., greater than 3 times the size of a pool of loaders), and so on.

The following code snippet provides an example of operations performed by the tracking module 210 when monitoring and/or tracking data transformation operations:

```
BATCH_TRACKER{
    int batch_num;
    int min; // min value of index column in current batch
int max; // max value of index column in current batch
int status;// 0 - the batch loaded successfully, // 1 - loader is load the
batch, // 2 - the batch failed to load int status;
}
Queue<BATCH_TRACKER> batch_tracker_queue; // global variable
accessible to both reader and loaders.
```

The following code snippet provides an example of operations performed by the tracking module 210 when determining the occurrence of a broken transformation:

```
Int max_index; // all data whose INDEX_COLUMN less than
max_index has been copied to DESTINATION table successfully
while (true){ // this thread will killed by main thread after all data is
transformed, or self exit due to loader failure
if(batch_tracker_queue.first.status == 1 && batch_tracker_queue.size <
3*loaderpool.size){
    sleep(1000);
}else if(batch_tracker_queue.first.status == 0){
    max_index = batch_tracker_queue.first.max;
    batch_tracker_queue.dequeue; }else
if(batch_tracker_queue.first.status == 2){ //failed
try{
    if(use_auto_correct_load)
        runSql(DESTINATION_TABLE, "DELETE FROM
DESTINATION_TABLE WHERE INDEX_COLUMN >= %1",
max_index);
}finally{
    save_max_index_to_local(max_index);
}
exit(1);
    }
}
```

In some example embodiments, the index break module 220 is configured and/or programmed to identify a maximum value for a date attribute contained within an index column for all rows of the data table that were successfully loaded to the destination database 130 during the data transformation.

For example, for any or all rows of data successfully stored in the destination database 130, the index break module 220 identifies the row that includes the largest, greatest, or maximum value for a date attribute associated with the rows of data. The date attribute may be a created_at attribute, which provides a value (e.g., date and/or time) for a creation date of data contained within a row of the data table, an updated_at attribute, which provides a value for a recent or last access date of data contained within a row of the data table, and so on.

In some example embodiments, the index break module 220 may utilize date attribute or other attributes or index column values in order to determine a break in the index, and, hence, the break in the data transformation. For example, the index break module 220 may utilize other index column attributes that provide information to be used in determining where to resume a transformation. These attributes contain data, such as values, that meet some or all of the following rules:

The data may be queried, such as using the IN WHERE clause or operation;

The data may be sorted, such as using the ORDER clause or operation;

The data may be unchangeable once the value is set; and/or

The value of newer data is larger than the value of comparatively older data.

Thus, when identifying a break in a data transformation (e.g., by identifying the maximum value of an attribute) the index break module 220 may utilize the values or other data within an index column of successfully stored rows of data, where the index column includes values that are queryable, sortable, unchangeable, and representative of the comparative age of associated data, among other things.

In some example embodiments, the index break module 220 may identify or otherwise determine a largest and greatest value of the index from batch information. For example, the index break module 220 may read data in batches, and store batch information in "batch_tracker," which is queued in "batch_tracker_queue," and ordered by "batch_num." "Batch_num maintains the order of the data because the data is read in order.

For example, the reader 115 may read data in four batches, a Batch 1 for rows 1-100 of a table in the source database 110, a Batch 2 for rows 101-200 of the table in the source database 110, a Batch 3 for rows 201-300 of the table in the source database 110, and a Batch 4 for rows 301-400 of the table in the source database 110. After a certain period of time, the batch_tracker_queue is in the following state:
(batch_num=1, status=0)
(batch_num=2, status=0)
(batch_num=3, status=2)
(batch_num=4, status=0).

The batch_tracker information in the batch_tracker_queue reflects that Batches 1, 2, and 4 loaded successfully and Batch 3 failed. Therefore, the index break module 220 identifies Batch 3 as being a broken index, and records a value for max_value as 200, the max value of Batch 2), and not a value of 400.

In some example embodiments, the data selection module 230 is configured and/or programmed to select a group of rows of data of the data table stored in the source database 110 by querying the source database 110 to identify rows that include a value for the date attribute that is greater than the identified maximum value. For example, the data selection module 230 may perform an IN WHERE operation or other query operation using the identified maximum value, in order to identify rows of data within the source database 110 that were not successfully loaded to the destination database 130 (e.g., are not stored by the destination database 130).

In some example embodiments, the resume module 240 is configured and/or programmed to sort the selected group of rows of data of the data table stored in the source database 110, and cause one or more loaders 135 associated with the destination database 130 to perform a load or write operation to load the sorted group of rows of data to the destination database 130. For example, when a single loader 135 is being utilized, the resume module 240 causes the loader 135 to perform an INSERT operation to load the sorted rows of data to the destination database 130.

However, when multiple loaders 135 are being utilized, the resume module 240 causes the loaders 135 to perform operations that remove or correct some or all of the data successfully stored in the destination database 130, in order to avoid and/or prevent redundancies or inconsistencies when resuming the data transformation, among other things. For example, the resume module 240 may cause each loader 135 to perform an AUTOCORRECT operation when loading a batch of data (e.g., multiple rows of data assigned to the loader 135) to the destination database 130, and/or may cause each loader 135 to delete any rows stored within the destination database 130 that include a value for the date attribute that is greater than the identified maximum value, and perform an INSERT operation to load the sorted group of rows of data to the destination database 130.

The following code snippet provides an example of operations performed by the modules of the transformation resume engine 150 when identifying and resuming broken data transformations:

```
Reader reader;
Pool<Loader> loader_pool;
boolean resume_enabled; // this value read from configuration
boolean use_auto_correct_load;
String source_query_sql = "SELECT COL_1,..,COL_n FROM SOURCE_TABLE
WHERE INDEX_COLUMN >= %1 ORDER BY
INDEX_COLUMN";
int last_max = MIN_INT; //
int current_max;
// resuming case - find the index where it broke last time
if (DESTINATION_TABLE.ROW_COUNT > 0 && resume_enabled){
// referring to "monitor thread" below - In failure case, monitor thread may save
resume index locally,
// in case it has no chance to clean up DESTINATION_TABLE based on resume
index for some reason, e.g. network issue
last_max = read_last_max( ); // it can either read from local or from
DESTINATION_TABLE, depending on how monitor thread did in last broken
if(!use_auto_correct_load)
runSql(DESTINATION_TABLE, "DELETE FROM DESTINATION_TABLE
WHERE INDEX_COLUMN >= %1", last_max);
}
// reader starts reading data from SOURCE_TABLE
// if it is a resuming case, it will read starting from last broken index.
// reader reads data in batch and feed each batch to one loader borrowed from
loader_pool
reader.runSql(SOURCE_TABLE, source_query_sql, last_max);
int batch_count=0;
while (reader.hasMoreDataToRead( )){
    data = reader.read(batch); // batch data
// batch count, min INDEX_COLUMN value in current batch data, max
INDEX_COLUMN value in current batch data, 1 - loading status
bt = new batch_tracker(++batch_count, findMin(data, INDEX_COLUMN),
findMax(data, INDEX_COLUMN), 1);
    batch_tracker_queue.enqueue(bt);
    loader = loader_pool.borrow( );
    loader.set_batch_tracker(bt);
    loader.load(data); // loader updates status to bt --- 0 for success, 2 for fail
}
load(data){
    try{ if(use_auto_correct_load && bt.batch_num < 3*loader_pool.size( ))
    auto_correct_load_to_destination_table(data);
        else
```

```
    insert_to_destination_table(data); bt.status = 0;
}catch(Exception e){
    bt.status =2;
   }}
```

Of course, other code snippets and/or threads may be performed by the modules of the transformation resume engine 150.

As described herein, in some example embodiments, the transformation resume engine 150 performs various processes and/or methods to identify breaks in data transformations or other data storage operations, and use information associated with the identified breaks when selecting data to be transformed during the resuming of the data transformations, among other things.

Figure 3:
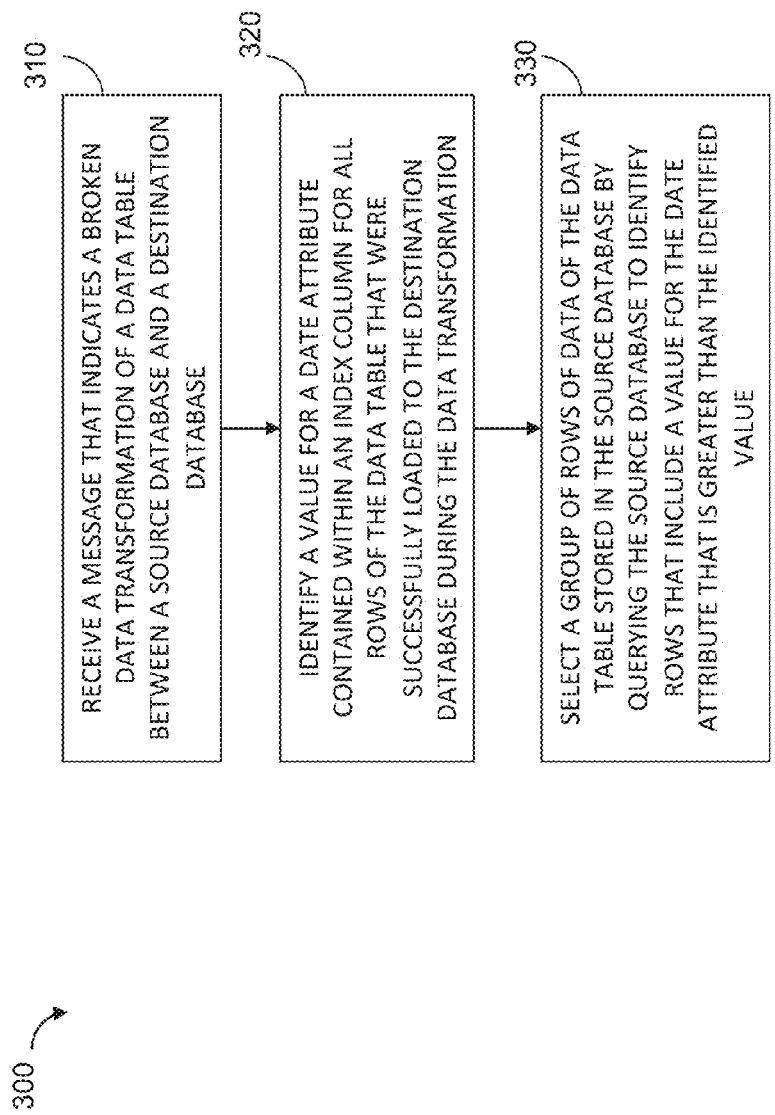
FIG. 3 is a flow diagram illustrating a method for selecting data when resuming a data transformation, in some example embodiments.

FIG. 3 is a flow diagram illustrating a method 300 for selecting data when resuming a data transformation, in some example embodiments. The method 300 may be performed by the transformation resume engine 150 and, accordingly, is described herein merely by way of reference thereto. It will be appreciated that the method 300 may be performed on any suitable hardware.

In operation 310, the transformation resume engine 150 receives a message that indicates a broken data transformation of a data table between a source database and a destination database. For example, the tracking module 210 may receive a message that indicates an occurrence of a broken data transformation of a data table between the source database 110 and the destination database 130, such as a message indicating a failure of one or more loaders 135, a message indicating an unknown operation status for one or more loaders 135 performing the data transformation, a message indicating a slow or hanging loader 135 or loaders 135, or other messages indicating a broken or unsuccessful data transformation.

In operation 320, the transformation resume engine 150 identifies a value for a date attribute contained within an index column for all rows of the data table that were successfully loaded to the destination database 130 during the data transformation. For example, for any or all rows of data successfully stored in the destination database 130, the index break module 220 identifies the row that includes the "largest and greatest" or "maximum" value for a date attribute associated with the rows of data, as described herein. The date attribute may be a created_at attribute, which provides a value (e.g., date and/or time) for a creation date of data contained within a row of the data table, an updated_at attribute, which provides a value for a recent or last access date of data contained within a row of the data table, and so on.

In operation 330, the transformation resume engine 150 selects a group of rows of data of the data table stored in the source database 110 by querying the source database 110 to identify rows that include a value for the date attribute that is greater than the identified maximum value. For example, the data selection module 230 may perform an IN WHERE operation or other query operation using the identified maximum value, in order to identify rows of data within the source database 110 that were not successfully loaded to the destination database 130 (e.g., are not stored by the destination database 130).

Figure 4A:
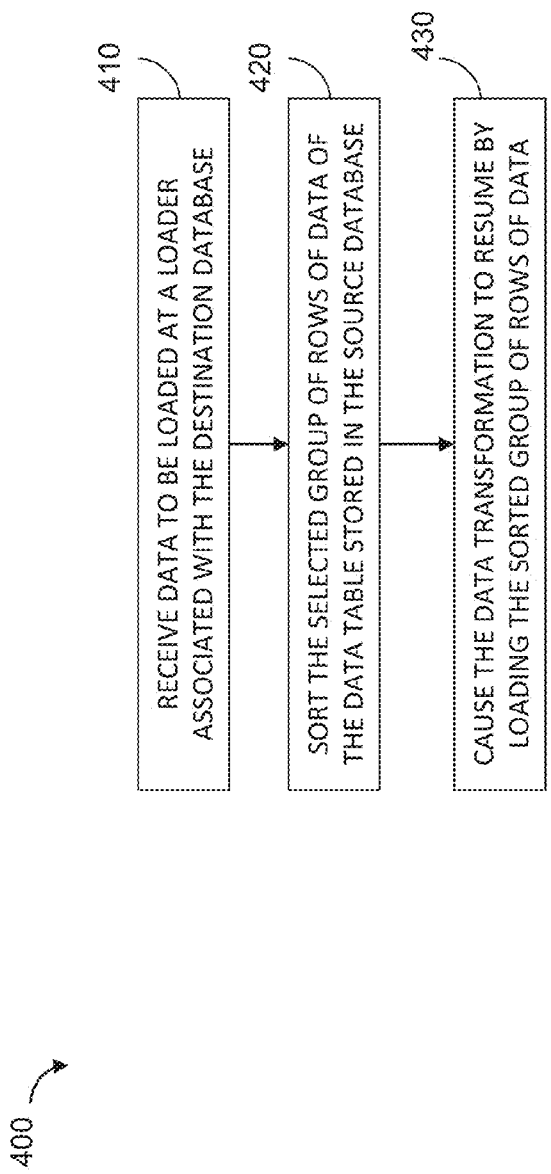
FIG. 4A is a flow diagram illustrating a method for resuming a data transformation with a single loader, in some example embodiments.

As described herein, in some example embodiments, the transformation resume engine 150 causes the data transformation to resume operation using a group or batch of rows of data of the source database 110 that have not yet been successfully transformed to the destination database 130. FIG. 4A is a flow diagram illustrating a method 400 for resuming a data transformation with a single loader, in some example embodiments. The method 400 may be performed by the transformation resume engine 150 and, accordingly, is described herein merely by way of reference thereto. It will be appreciated that the method 400 may be performed on any suitable hardware.

In operation 410, the transformation resume engine 150 sorts the selected group of rows of data of the data table stored in the source database 110. For example the transformation resume engine 150 (e.g., via the data selection module 230) performs an ORDER operation on the selected group of rows of data of the data table in order to sort the rows by their creation date values, among other things.

In operation 420, a single loader 135 receives data (or information identifying the data) to be loaded to the destination database 130. For example, a single loader 135 receives the data selected and sorted by the data selection module 230.

In operation 430, the transformation resume engine 150 causes the data transformation to resume by loading the sorted group of rows of data to the destination database 130. For example, the resume module 240 may cause the single loader 135 to perform an INSERT operation in order to load the sorted group of rows of data into the data table stored by the destination database 130.

In some example embodiments, multiple loaders 135 handle or otherwise perform load operations for data received over the network 120 from the reader 115. In these configurations, each of the multiple loaders 135 may perform additional and/or alternative operations in order to avoid inconsistencies and/or redundancies in loading data to the destination database 130 when resuming a data transformation. For example, two loaders 135 may have successfully loaded a few batches of data before a break in a data transformation, and one loader 135 may have not loaded any batches of data, causing the break in the data transformation.

Figure 4B:
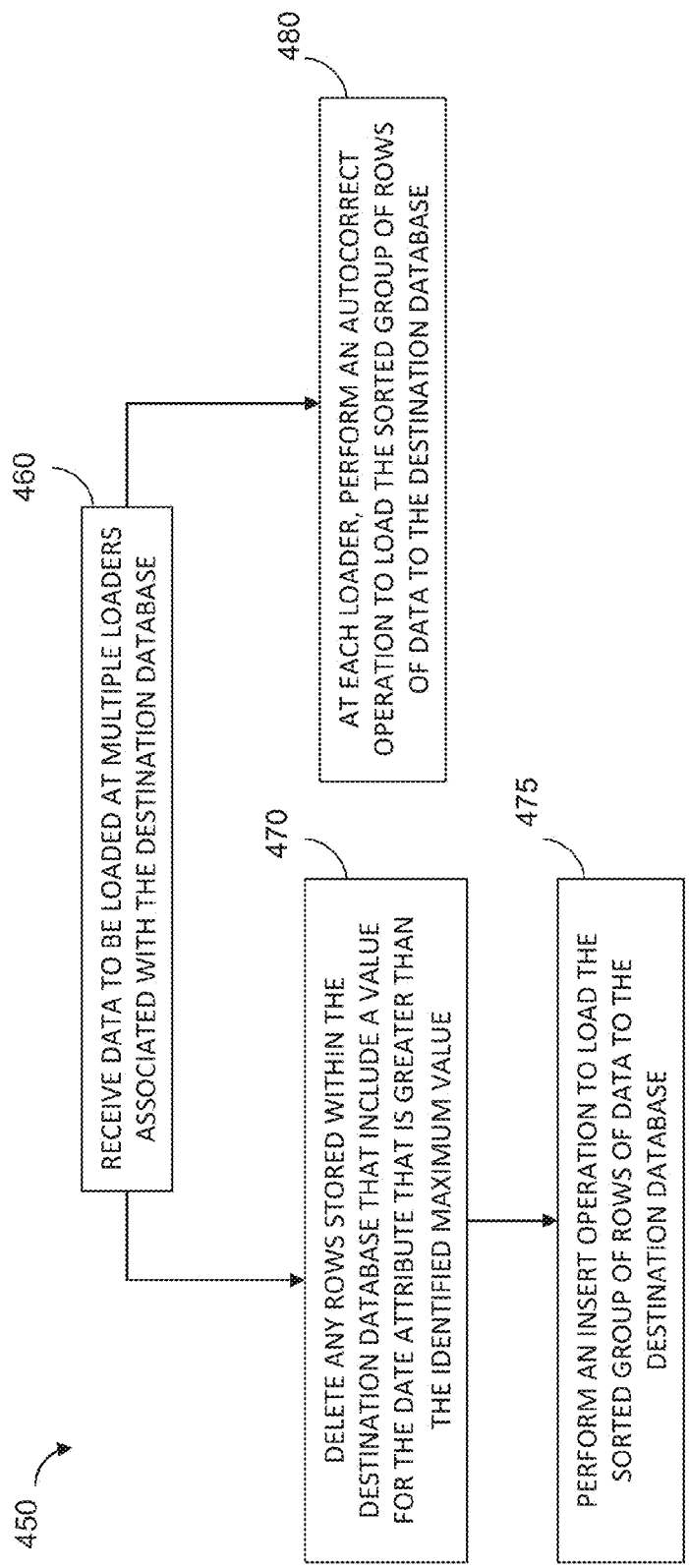
FIG. 4B is a flow diagram illustrating a method for resuming a data transformation with multiple loaders, in some example embodiments.

Thus, the loaders 135 may perform various operations to avoid any loading issues. FIG. 4B is a flow diagram illustrating a method for resuming a data transformation with multiple loaders, in some example embodiments. The method 450 may be performed by the transformation resume engine 150 and, accordingly, is described herein merely by way of reference thereto. It will be appreciated that the method 450 may be performed on any suitable hardware.

In operation 460, multiple loaders 135 receive data (e.g., one or more batches of data) to be loaded to the destination database 130. In operation 470, the transformation resume engine 150 deletes any or all rows stored within the destination database 130 that include a value for the date attribute that is greater than the identified maximum value, and, in operation 475, perform an INSERT operation to load the sorted group of rows of data to the destination database 130. For example, the resume module 240 may delete rows identified to include a value for a creation date that is greater than the identified maximum value for the creation date that is associated and/or indicative of the break in the data transformation, and perform the INSERT operation to load data from the source database 110, in order to complete the data transformation.

Alternatively, in operation 480, each of the loaders 135 performs an autocorrect operation to load the sorted group of rows of data to the destination database 130. For example, the resume module 240 may cause each loader 135 to perform an auto_correct_load operation (e.g., the auto_correct_load operation shown in the example code snippets) to update the data stored in the destination database 130 with the data from the source database 110, in order to complete the data transformation.

Figure 5A:
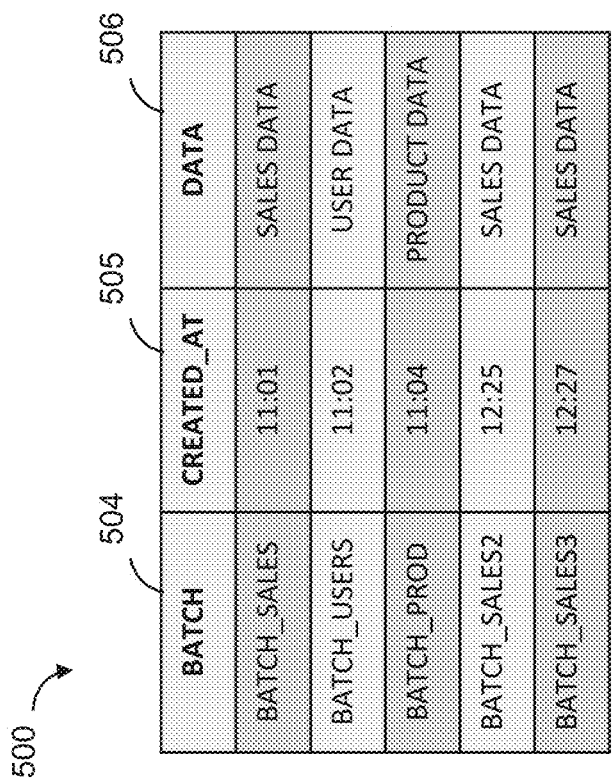

FIGS. 5A-5D depict an example of resuming a data transformation. In FIG. 5A, a database 500, or table, of sales data is shown. The database 500 includes various rows of data and various index columns of data, including an index column 504 that includes data identifying a batch of data, an index column 505 that includes values for creation dates for each of the batches of data, and an index column 506 that includes different types of sales data.

A user wishes to perform a transformation of the data stored in database 500 to a database 510 shown in FIG. 5B. Due to the large amounts of data, the transformation breaks (e.g., a loader fails), with the state of the transformation being shown in FIG. 5B. As shown in FIG. 5B, the transformation successfully loaded four rows, the BATCH_SALES row, the BATCH_USERS row, the BATCH_PROD row, and the BATCH_SALES3 row.

In order to resume the transformation, the transformation resume engine 150 identifies the created_at index column 505 as an index column that includes values that are queryable, sortable, unchangeable, and representative of the comparative age of associated data. The resume module 240 tracks the maximum value, or largest and greatest value, locally, within a table in source database 110, or elsewhere.

The transformation resume engine 150 identifies the largest and greatest value 520 of the values contained within the index column 505. In this example, the largest and greatest value 520 is the value 11:04 that is associated with the BATCH_PROD row. After the transformation failure, the data in the database 510 has a 11:01 value, a 11:02 value, a 11:04 value, and a 12:27 value. The resume module 240, therefore, records the largest and greatest value 520 as "11:04", and not as "12:27," because "12:27" is the largest value, but not the greatest value, since the row having the "12:25" value did not successfully load.

As shown in FIG. 5C, the transformation resume engine 150 selects the rows 530 of the database 500 that contain values for the index column 505 that are larger than the maximum value 520 of 11:04. In this example, the rows BATCH_SALES2 and BATCH_SALES contain values (e.g., 12:25 and 12:27, respectively) that are greater than the maximum value 520 of 11:04 contained in the index column 505 of the database 510. The transformation resume engine 150 resumes the transaction by deleting all records in database 510 with a value>="11:04" (e.g., rows with 11:04 and 12:27 are both removed), and causes the loaders 135 to load the selected rows 530, which include data with values for "WHERE CREATED_AT>=11:04, to the database 510, as shown in FIG. 5D.

Thus, the data stored by database 500 and depicted in FIG. 5A is stored in the database 510, as shown in FIG. 5D, and the data transformation is successful despite the earlier break during the transformation.

Figure 6:
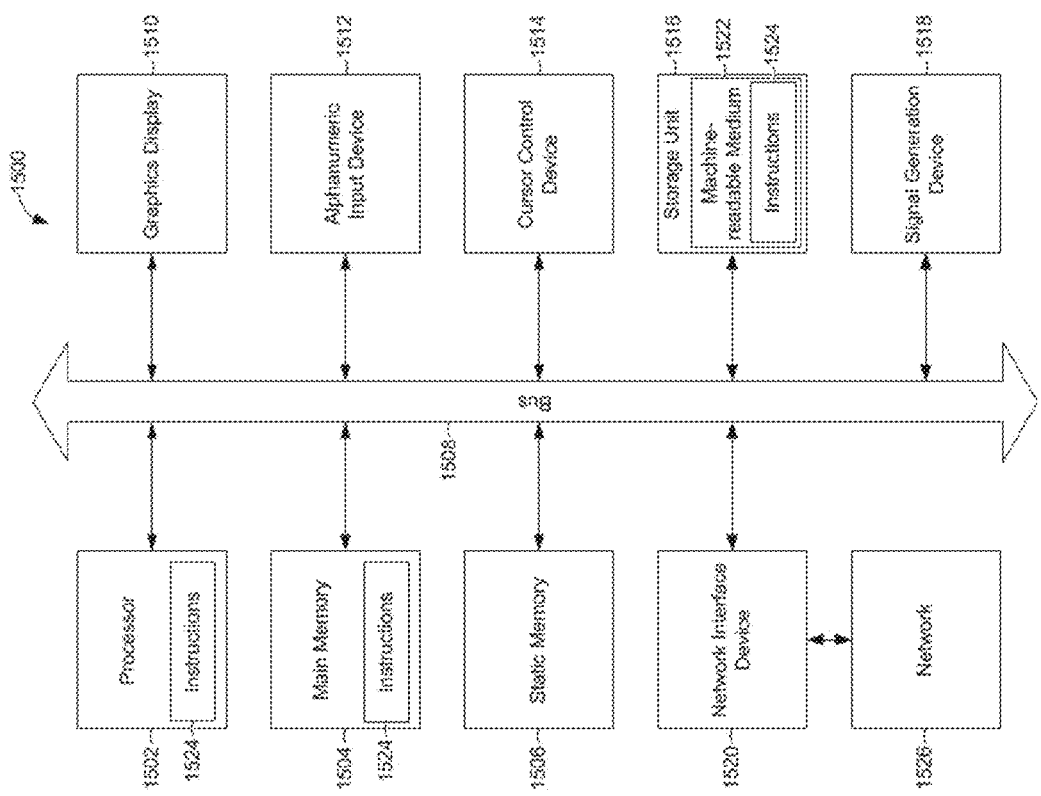
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 1500, according to some example embodiments, able to read instructions from a machine-readable medium (e.g., a machine-readable storage medium) and perform any one or more of the methodologies discussed herein, in whole or in part. Specifically, FIG. 6 shows a diagrammatic representation of the machine 1500 in the example form of a computer system and within which instructions 1524 (e.g., software, a program, an application, an applet, an app, or other executable code) for causing the machine 1500 to perform any one or more of the methodologies discussed herein may be executed. In alternative embodiments, the machine 1500 operates as a stand-alone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include a collection of machines that individually or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a graphics display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the processor 1502 (e.g., within the processor's cache memory), or both, during execution thereof by the machine 1500. Accordingly, the main memory 1504 and the processor 1502 may be considered as machine-readable media. The instructions 1524 may be transmitted or received over a network 1526 (e.g., network 120) via the network interface device 1520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions. The term "machine-readable medium" or "computer-readable medium" shall also be taken to include any medium, or combination of multiple media, that is capable of storing instructions (e.g., instructions 1524) for execution by a machine or computer (e.g., machine 1500), such that the instructions, when executed by one or more processors of the machine or computer (e.g., processor 1502), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A computerized method, comprising:
   receiving a message that indicates a broken data transformation of a data table between a source database and a destination database;
   identifying a value for a date attribute contained within an index column for all rows of the data table representing a largest value of the date attribute from the rows of the data table that were successfully loaded to the destination database during the data transformation such that newer data contained within the index column has a larger value for the date attribute comparative to older data contained within the index column; and
   selecting a group of rows of data of the data table stored in the source database by querying the source database to identify rows that include a value for the date attribute that is greater than the identified value.

2. The method of claim 1, further comprising:
   sorting the selected group of rows of data of the data table stored in the source database;
   receiving the sorted group of rows of data at multiple loaders associated with the destination database; and
   at each of the multiple loaders, performing an autocorrect operation to load the sorted group of rows of data to the destination database.

3. The method of claim 1, further comprising:
   sorting the selected group of rows of data of the data table stored in the source database;
   receiving the sorted group of rows of data at multiple loaders associated with the destination database;
   deleting any rows stored within the destination database that include a value for the date attribute that is a larger value but not a greater value, the larger but not greater value represents a larger value associated with the rows of the data table that were successfully loaded to the destination database during the data transformation after at least one row that did not successfully load to the destination database; and
   performing an insert operation to load the sorted group of rows of data to the destination database.

4. The method of claim 1, further comprising:
   sorting the selected group of rows of data of the data table stored in the source database; and
   causing the data transformation to resume by loading the sorted group of rows of data to the destination database.

5. The method of claim 1, wherein identifying the value for the date attribute contained within an index column for all rows of the data table that were successfully loaded to the destination database during the data transformation includes identifying a largest and greatest value for a created at attribute associated with a creation date of data contained within a row of the data table, the largest and greatest value for the created attribute associated with the creation date represents the rows of the data table that were successfully loaded to the destination database during the data transformation prior to at least one row that did not successfully load to the destination database.

6. The method of claim 1, wherein identifying the value for a date attribute contained within the index column for all rows of the data table that were successfully loaded to the destination database during the data transformation includes identifying a largest and greatest value for an updated_at attribute associated with a recent access date of data contained within a row of the data table, the largest and greatest value for the updated_at attribute associated with the recent access date represents the rows of the data table that were successfully loaded to the destination database during the data transformation prior to at least one row that did not successfully load to the destination database.

7. The method of claim 1, wherein receiving the message that indicates the broken data transformation of a data table between a source database and a destination database includes receiving a message indicating a failure to load a batch of data to the destination database during the data transformation.

8. The method of claim 1, wherein receiving the message that indicates the broken data transformation of the data table between the source database and the destination database includes receiving a message indicating an unknown operation status for one or more loaders performing the data transformation.

9. A system, comprising:
   a memory device for storing instructions; and
   a processor, which, when executing the instructions, causes the system to perform operations comprising:
   tracking operations of a data transformation and determine an occurrence of a broken data transformation of a data table between a source database and a destination database;
   identifying a value for a date attribute contained within an index column for all rows of the data table representing a largest and greatest value of the date attribute from the rows of the data table that were successfully loaded to the destination database during the data transformation prior to at least one row that did not successfully load to the destination database, newer data contained within the index column has a larger value for the date attribute comparative to older data contained within the index column; and selecting a group of rows of data of the data table stored in the source database by querying the source database to identify rows that include a value for the date attribute that is greater than the identified value.

10. The system of claim 9, wherein the processor, which, when executing the instructions, further causes the system to perform operations further comprising:

sorting the selected group of rows of data of the data table stored in the source database; and causing multiple loaders associated with the destination database to perform an autocorrect operation to load the sorted group of rows of data to the destination database.

11. The system of claim 9, wherein the processor, which, when executing the instructions, further causes the system to perform operations further comprising:

sorting the selected group of rows of data of the data table stored in the source database; and deleting any rows stored within the destination database that include a value for the date attribute that is greater than the identified value, and perform an insert operation to load the sorted group of rows of data to the destination database.

12. The system of claim 11, wherein the processor, which, when executing the instructions, further causes the system to perform operations comprising: identifying a largest and greatest value for a created_at attribute contained within the index column for all the rows of the data table, the largest and greatest value for the created attribute associated with the creation date represents the rows of the data table successfully loaded to the destination database during the data transformation prior to at least one row that did not successfully load to the destination database.

13. A computer-readable non-transitory storage medium comprising instructions, executed by a computing system, which cause the computing system to perform operations, comprising:

receiving a message that indicates a broken data transformation of a data table between a source database and a destination database;

identifying a maximum value for a date attribute contained within an index column for all rows of the data table that were successfully loaded to the destination database during the data transformation such that newer data contained within the index column has a larger value for the date attribute comparative to older data contained within the index column; and selecting a group of rows of data of the data table stored in the source database by querying the source database to identify rows that include a value for the date attribute that is greater than the identified maximum value.

14. The computer-readable non-transitory storage medium of claim 13, further comprising:

sorting the selected group of rows of data of the data table stored in the source database;

receiving the sorted group of rows of data at multiple loaders associated with the destination database; and at each of the multiple loaders, performing an autocorrect operation to load the sorted group of rows of data to the destination database.

15. The computer-readable non-transitory storage medium of claim 13, further comprising:

sorting the selected group of rows of data of the data table stored in the source database;

receiving the sorted group of rows of data at multiple loaders associated with the destination database;

at each of the multiple loaders, deleting any rows stored within the destination database that include a value for the date attribute that is greater than the identified maximum value; and performing an insert operation to load the sorted group of rows of data to the destination database.

16. The computer-readable non-transitory storage medium of claim 13, further comprising:

sorting the selected group of rows of data of the data table stored in the source database; and causing the data transformation to resume by loading the sorted group of rows of data to the destination database.

17. The computer-readable non-transitory storage medium of claim 13, wherein identifying the maximum value for a date attribute contained within the index column for all rows of the data table that were successfully loaded to the destination database during the data transformation includes identifying a maximum value for a created_at attribute associated with a creation date of data contained within a row of the data table.

18. The computer-readable non-transitory storage medium of claim 13, wherein identifying the maximum value for a date attribute contained within the index column for all rows of the data table that were successfully loaded to the destination database during the data transformation includes identifying a maximum value for an updated_at attribute associated with a recent access date of data contained within a row of the data table.

19. The computer-readable non-transitory storage medium of claim 13, wherein receiving a message that indicates a broken data transformation of a data table between a source database and a destination database includes receiving a message indicating a failure to load a batch of data to the destination database during the data transformation.

20. The computer-readable non-transitory storage medium of claim 13, wherein receiving a message that indicates a broken data transformation of a data table between a source database and a destination database includes receiving a message indicating an unknown operation status for one or more loaders performing the data transformation.

* * * * *